(12) United States Patent
Lin

(10) Patent No.: US 6,691,246 B1
(45) Date of Patent: Feb. 10, 2004

(54) SYSTEM AND METHOD OF PROCESSING PARTIALLY DEFECTIVE MEMORIES

(75) Inventor: Shi-Tron Lin, Taipei (TW)

(73) Assignee: Winbond Electronics Corp., Hsinchu (TW)

(*) Notice: Subject to any disclaimer, the term of this patent is extended or adjusted under 35 U.S.C. 154(b) by 653 days.

(21) Appl. No.: 09/690,327

(22) Filed: Oct. 16, 2000

(30) Foreign Application Priority Data

Dec. 21, 1999 (TW) .................................. 88122503 A

(51) Int. Cl.[7] .................................................. G06F 11/00
(52) U.S. Cl. ........................... 714/8; 714/34; 714/35; 717/129
(58) Field of Search ............................... 714/8, 34, 35, 714/42, 53, 54, 710, 711; 717/129; 365/200, 201

(56) References Cited

U.S. PATENT DOCUMENTS

| | | | |
|---|---|---|---|
| 4,939,694 A | 7/1990 | Eaton et al. | 365/200 |
| 5,278,847 A | 1/1994 | Helbig, Sr. et al. | 371/40.2 |
| 5,579,266 A | 11/1996 | Tahara | 365/200 |
| 5,644,541 A | 7/1997 | Siu et al. | 365/200 |
| 6,108,797 A * | 8/2000 | Lin et al. | 714/8 |
| 6,141,768 A * | 10/2000 | Lin et al. | 714/8 |
| 6,178,549 B1 * | 1/2001 | Lin et al. | 717/124 |
| 6,295,595 B1 * | 9/2001 | Wildenberg et al. | 711/211 |
| 6,370,655 B1 * | 4/2002 | Lin | 714/8 |

* cited by examiner

Primary Examiner—Scott Baderman
(74) Attorney, Agent, or Firm—Ladas & Parry

(57) ABSTRACT

A method of processing a partially defective memory for loading a machine code program into a memory device that includes at least one defective memory cell. At first the machine code program is scanned. In addition, a movable code block between two break points, which is ready to be loaded to the defective memory cell of the memory device, is determined. Then the block code is moved to a memory space between a first address and a second address in which there is no defective memory cell. Finally, the moved code block should be linked in the execution sequence with the unmoved portion of the machine code program and the addressing references correlated between the moved code block and the unmoved portion of the machine code program should be modified is and corrected. The resulting machine code program can be properly loaded and executable.

51 Claims, 11 Drawing Sheets

SYSTEM AND METHOD OF PROCESSING PARTIALLY DEFECTIVE MEMORIES

FIELD OF THE INVENTION

The present invention relates to a system and method of processing partially defective memories. More particularly, it relates to a system and method of adjusting a program code that either has not yet been loaded into or already resides in memory. The present invention allows program codes to be loaded into a memory with partially defective memory cells and further be executed.

DESCRIPTION OF THE PRIOR ART

In the past, memory integrated circuits (ICs) containing any defective memory cell generally will not be sold on the market. To reduce the number of the memory ICs that are thrown away due to one or more defects, there are at present many techniques that can repair defective memory ICs thereby allowing them to work normally.

For example, U.S. Pat. No. 4,939,694 disclosed a memory system that has self-testing and self-repairing functions. The memory system can perform an on-site self-test process to locate defective memory cells. Once these defective memory cells are located, the memory system will use an error correction code engine to correct these defective memory cells. When the error correction code engine becomes overburdened with defective memory cells, the memory system automatically deletes these defective memory cells.

Furthermore, U.S. Pat. No. 5,644,541 disclosed a technique of using substitution memories to correct semiconductor memories with defective memory cells. All access routes to these bad bit-locations are redirected to good memory cells within the substitution memory by using a mapping logic circuit, whereby the defective memory cells are replaced.

A fault-tolerating memory system, disclosed in U.S. Pat. No. 5,278,847, uses an error detecting and correcting code (EDAC). Reliability of storage data can be determined by using the EDAC for each data cell and for adding spare-bits.

In U.S. Pat. No. 5,579,266, a laser-repairing technique and a programmable fuse repairing technique are used to deal with defective memory cells, wherein redundant memories can be used to replace defective memories.

In fact, the error-detecting and repairing technique disclosed in U.S. Pat. No. 4,939,694, the encoding and spare bit technique disclosed in U.S. Pat. No. 5,278,847, and the access-redirecting technique disclosed in U.S. Pat. No. 5,644,541 do not only complicate the hardware design, but also suffer an execution overhead as programs are executed. Further, for the redundancy memory technique disclosed in U.S. Pat. No. 5,579,266, the hardware design and the practical procedure for repairing defective memory cells are also complicated.

On the other hand, an executable machine code program is generated from the source code of a computer program by using compilers and linkers. The machine code program can be directly downloaded to memories for execution. FIG. 1 (PRIOR ART) shows a system structure of a general single chip computer or a system-on-a-chip. As shown in FIG. 1, the system comprises a central processing unit (CPU) or microprocessor 1, random access memories (RAMs) 3, read-only memory (ROMs) 5, an I/O interface circuit 7, and external storage devices 9 such as hard-disk drives, floppy disk drives, or CD-ROM drives. The general operation is that the CPU 1 loads an executable machine code program from the I/O interface circuit 7 or the external storage devices 9 into the RAMs 3 via data/address bus 10. Generally, a machine code program is comprised of three segment types, instruction segments, data segments, and stack segments, respectively. The CPU 1 executes the machine code program from the entry point of one of the instruction segments.

FIG. 2 (PRIOR ART) is a flow chart illustrating the process of executing a machine code program. First, an entry point is acquired (S1). Then, the address of the next instruction is fetched (S2). According to the address, the opcode of the next instruction can be fetched (S3). Then, the opcode is decoded (S4). Next, determination of whether one or more operands are needed for the current instruction can be determined by the decoded information of the current instruction. Then, the operand can be read from the follow-up address, if any (S5). Finally, the instruction is executed by the operation defined in the fetched opcode and the data/reference addresses defined in the operand (S6). If the current instruction is a termination instruction (S7), the process of executing the machine code program finishes (S8). Otherwise, the process goes back to step S2 to acquire the address of the next instruction. Apparently, it is possible that each instruction does not have the same number of bytes. The instruction length depends on the type of the CPU. Generally, there are two types of instruction sets applied in various CPUs, the variable-length instruction set and the constant length instruction set.

The above-described execution procedure only can be applied to the instruction segments of the machine code program. If the same execution procedure is applied to other segments, such as the data segments or the stack segments, the decoding result will be erroneous. In this case, when a data byte is decoded into a faulty opcode by the CPU 1, several sequent data will be mistaken for operands according to the faulty opcode. Generally, the CPU 1 cannot automatically distinguish the instruction segment from the data segment or the stack segment via standard fetching and decoding actions. Furthermore, the instruction segments and the data/stack segments of the program cannot be randomly is broken. The instruction pools must be broken based on each complete instruction, including its opcode and the follow-up operands. Generally, the data/stack segments cannot be broken because some of the interrelation within the data/stack segments only can be determined during execution, such as array data structures.

SUMMARY OF THE INVENTION

The object of the present invention is to provide a system and method of processing a partially defective memory. The storage pattern of a program code, which has not been loaded yet or has existed in the partially defective memories, can be modified to avoid the use of the defective memory cells without changing the hardware design or increasing the execution overhead.

Accordingly, the invention provides a method of processing a partially defective memory for loading a machine code program into a memory device with a plurality of memory cells. For example, suppose that the memory device has at least one defective memory cell. The original machine code program is scanned first to determine a first break point and a second break point at the locations before and after the defective address corresponding to the defective memory cell in the original machine code program. Then the code block between the first break point and the second break point is moved to an address space between a first address and a second address that does not include the defective address. When the moved code block includes at least one executable instruction (i.e. includes the instruction segment), it is necessary to link the moved block code and the unmoved portion of the original machine code program in execution sequence. If there are addressing references between the moved code block and the unmoved portion of the original machine code program or within the moved code block code, these addressing references should be adjusted. At last, the unmoved portion of the original machine code program, the linking instructions and the moved code block are sequentially loaded to the memory. Since the program is loaded by using the aforementioned method, it is in an executable status and will not be attached by the defective memory cells. In other words, the memory device can still work normally even if there are defective memory cells in the memory device. Further, the above processing procedure does not need to alter or modify the hardware circuitry. Therefore, the cost is quite low.

Further, if the source codes of the machine code program have been modularized, it is convenient to determine these usable break points. However, if the source codes are not modularized, we need to sequentially read the machine code program to locate a plurality of break points according to the instruction format used in the machine code. Then the first break point and the second break point can be determined by using the defective address and the length of several inserted linking instructions.

The present invention provides a process to properly scan the whole machine code program. At first, two data tables are required. The first data table is used to save the reserved addresses that are ready to be scanned, which can be the branch-to address or the next address of a conditional branch instruction in the machine code program. The second data table is used to record an address range in the machine code program that has been scanned. If the read instruction is a conditional branch instruction, the branch-to address or the next address of the conditional branch instruction is recorded in the first data table and the scanning continues from the other address pertaining to the conditional branch instruction. After each instruction is read and processed, the address range recorded in the second data table is updated to trace the scanning. In addition, the break points of the machine code program can be determined and outputted after reading each of the instructions. If the read instruction is a termination instruction, the loader should verify if there is any reserved address stored in the first data table. If yes, the loader should keep reading the instructions of the machine code program from the reserved address and remove the processed reserved address from the first data table. If there is no reserved address stored in the first data table, the scanning is ended. During the scanning process, the loader can check the scanned region based on the address range stored in the second data table to prevent looping situations.

Further, two unconditional branch instructions can be inserted to connect the moved code block and the unmoved portion of the machine code program. The first unconditional branch instruction is inserted at the address of the first break point and the branch-to address of the first unconditional branch instruction is the first address of the moved code block. The second unconditional branch instruction is inserted at the second address of the moved code block and the branch-to address of the second unconditional branch instruction is the second break point.

The aforementioned method can be slightly changed in practical usage. Therefore, the present invention also provides another procedure to process a partially defective memory. This second procedure is slightly different from the first one. At first, the machine code program is scanned to determine a code block between a first break point and a second break point at an address range before and after the defective address corresponding to the defective memory cell. Then the whole machine code program is first loaded to memory. In addition, the code block between the first break point and the second break point is re-loaded into memory cells between the first memory cell and the second memory cell that do not include the defective memory cells. As in the above-described method, the re-loaded code block should be connected to the other portion of the machine code program in execution sequence and the addressing references also should be modified. In addition to achieving the same purpose as the previous method, processing the program in the memory device can speed up these preprocessing steps, such as modifying addressing references.

Furthermore, the present invention further provides yet another or third method of processing a partially defective memory, which can be applied to the situations wherein the machine code program has already been loaded in a memory device. The memory can be repeatedly tested until there is at least one weakened memory cell discovered in the memory. Then the machine code program is scanned so that the two break points can be determined at the locations before and after the defective address corresponding to the weakening memory cell. Then the code block between the first break point and the second break point is moved to a memory space between a first memory cell and a second memory cell is that does not include the aforementioned weakening memory cell. As with the previous methods, the moved code block is connected to the unmoved portion of the machine code program in execution sequence and the addressing references are modified. Since the method can be applied to the memory in use, it is more convenient in practical applications.

BRIEF DESCRIPTION OF THE DRAWINGS

The present invention can be more fully understood from the following detailed description and preferred embodiments with reference to the accompanying drawings in which.

DETAILED DESCRIPTION OF THE PREFERRED EMBODIMENT

The method and system of processing a partially defective memory in the present invention are intended to allow for modification of a machine code program that is ready to be loaded or has already been loaded by avoiding the use of defective memory cells. Therefore, the memory ICs that are partially defective can still work. The method of modifying the original machine code program is achieved by identifying break points in the machine code program and then by moving away several predetermined code blocks which were expected to be stored in the defective memory cells. More specifically, the break points of the original machine code program must be first identified. Then moveable code blocks, each of which is located between two break points and ready to be loaded in the defective memory cells of the memory device, are determined. These movable code blocks can instead be moved to memory cells that work normally. The execution sequence between the moved code blocks and the unmoved portions of the original machine code program can be connected by using several linking instructions. Therefore, the defective memory cells can be skipped in a roundabout way. Since it is not necessary to re-design or change the hardware (the only additional task required is to run a small number of linking instructions), the objective of the present invention is thereby achieved. The embodiments of the present invention will be described in detail with reference to the accompanying drawings.

First Embodiment

Figure 1:
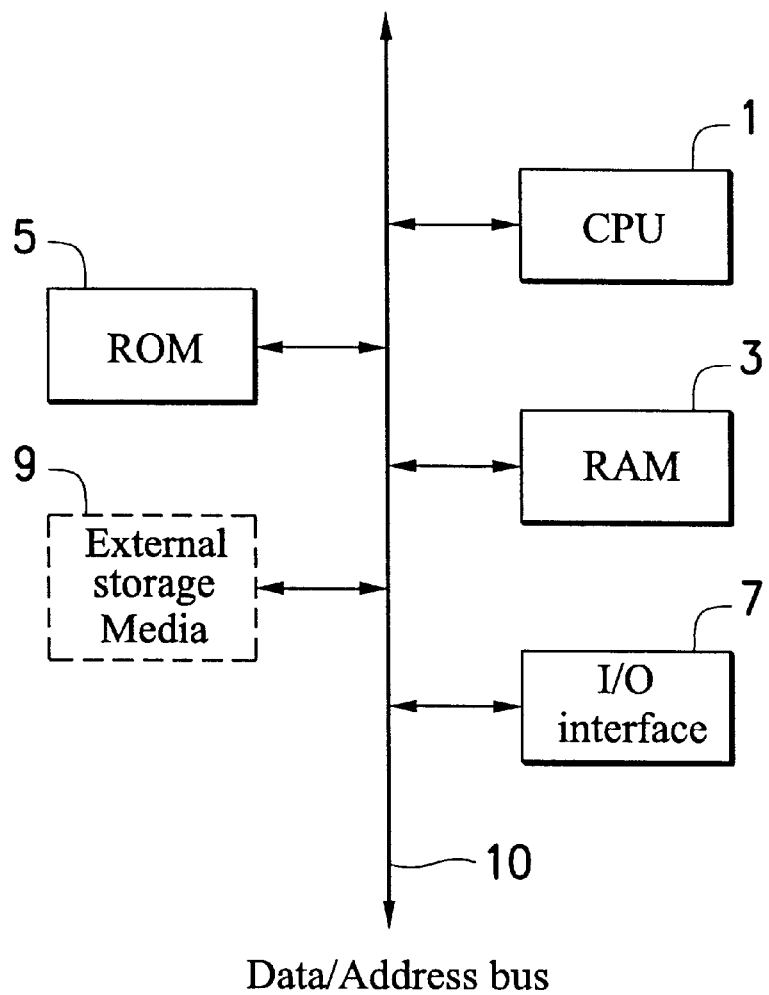
FIG. 1 (PRIOR ART) shows a configuration of a single chip computer or a system-on-a-chip.
Figure 2:
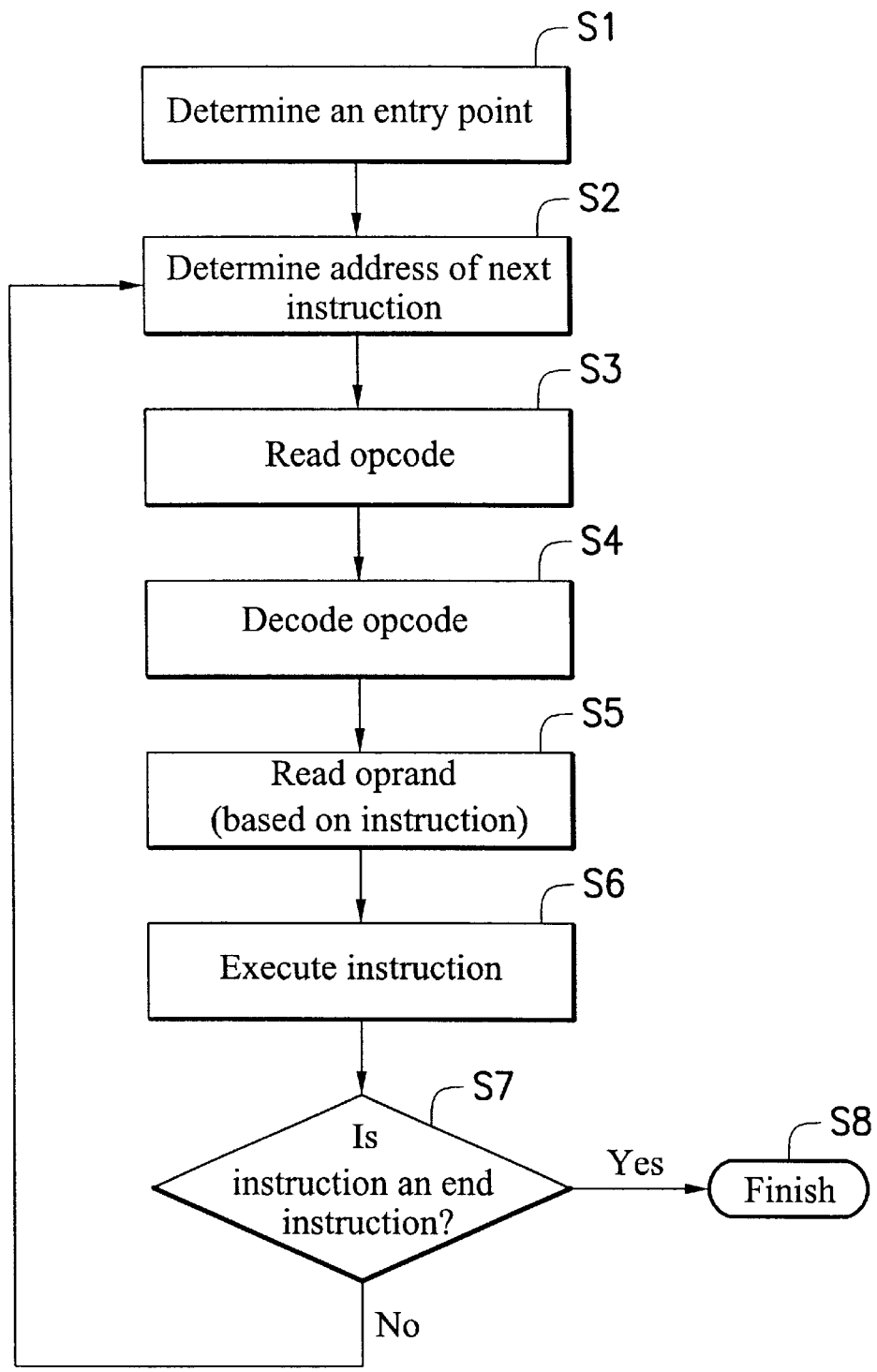
FIG. 2 (PRIOR ART) is a flowchart illustrating the conventional procedure of executing a machine code program.
Figure 3:
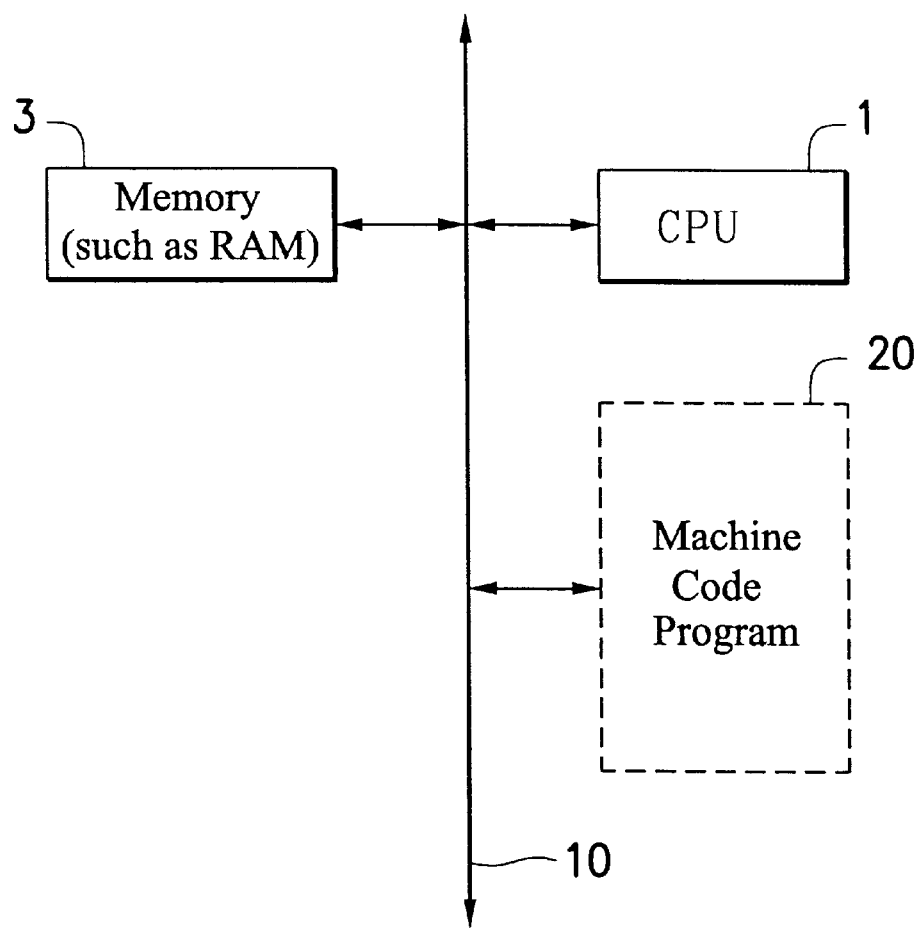
FIG. 3 shows a block diagram of a system for processing partially defective memory in accordance with the first embodiment of the present invention.

FIG. 3 shows a block diagram of a system for processing a partially defective memory in accordance with the first embodiment of the present invention. In FIG. 3, suppose that the memory 3 contains at least one defective memory cell. Except that different conditions are particularly pointed out, there is only one single defective memory cell or a group of adjacent defective memory cells in these embodiments. The CPU 1 is used to load machine code program 20 into memory 3 via the data/address bus 10. In addition, the memory locations to which the machine code program 20 is to be loaded include the aforementioned defective memory cells. Therefore, the loader executed by CPU 1 has to execute some pre-processing actions so as to assure that the machine code program 20 will not be loaded in any defective memory cell, thereby guaranteeing that the source code 20 can be properly executed after being loaded. In this embodiment, the CPU 1 and the memory 3 can be integrated in the same integrated circuit (IC), such as in the application of a system-on-a-chip. Further, the CPU 1 and the memory 3 can be different ICs which are connected via specified IC pins to execute the steps of checking and processing defective memory cells.

Figure 4:
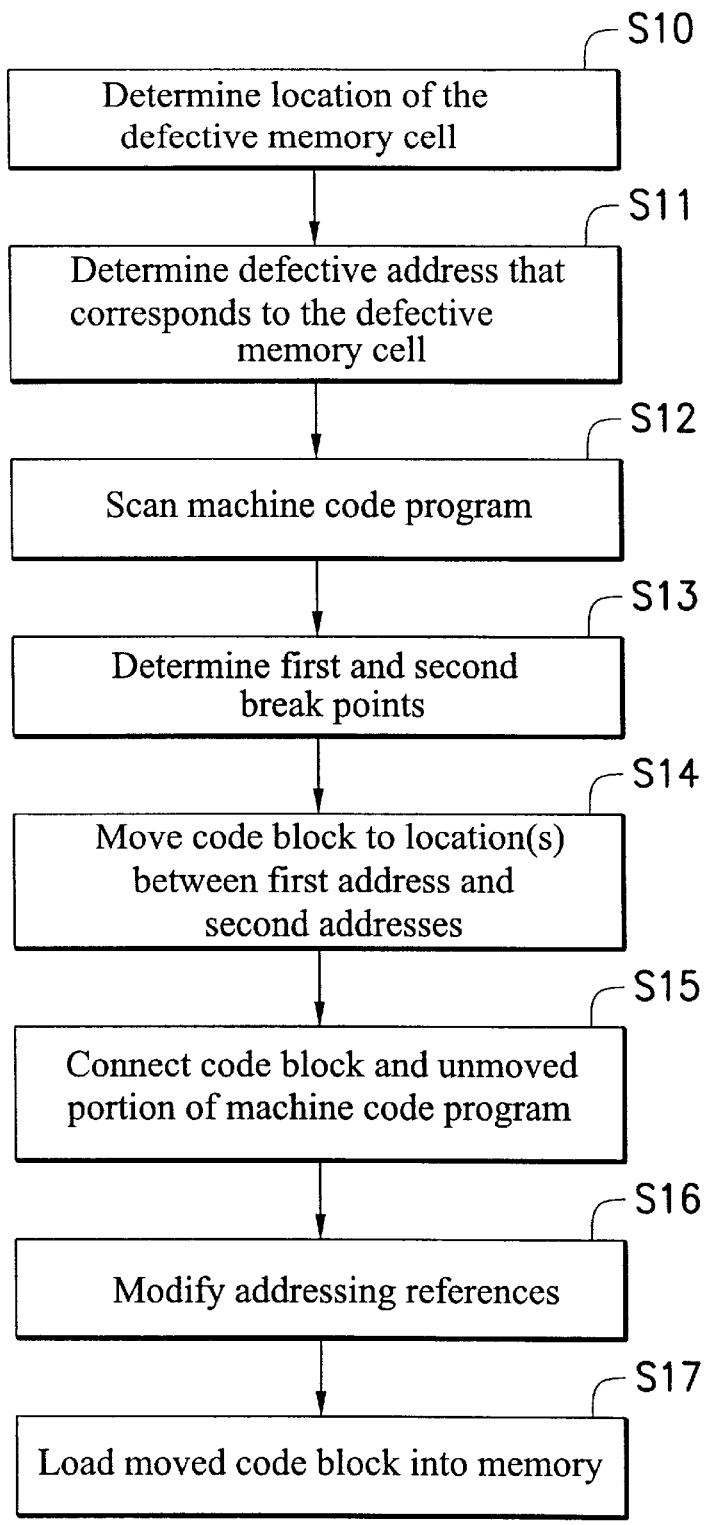
FIG. 4 shows a flowchart of a method of processing a partially defective memory in accordance with the first embodiment of the present invention.

FIG. 4 shows a flowchart of the method of processing a partially defective memory in accordance with the first embodiment of the present invention, wherein the steps that the CPU 1 has to execute before loading the machine code program 20 are described in detail. At first, the CPU 1 has to decide the physical locations of the defective memory cells in the memory 3 (S10). That is, memory 3 is tested to determine if there is any defective memory cell and where its physical location is. There is a common test method for checking if a memory cell is defective, which writes data "1" and "0" to each memory cell under test, respectively, reads the memory cell under test, and check if the read-out data is the same as the original data. If input and output are different, it means that the memory cell under test is defective. The device for performing the above test process can be the CPU itself or an external tester/computer.

According to the determined physical locations of the defective memory cells and the addressing information (such as the entry point address) of the loaded source code 20, the matched code address that corresponds to the defective memory cell in the machine code program 20 (S11) can be determined. The term "defective address" means the absolute reference address of the defective memory cell in the machine code program 20. Since the defective memory cell cannot work normally, the loader that the CPU 1 executes has to load the codes that were predetermined to be loaded into the defective memory cell to other memory cells, thereby preventing the loss of a data. However, as described above, the machine code program cannot be randomly broken since the integration of an instruction must be maintained. Randomly moving one byte of data can scramble the organization of the instruction segments and the data/stack segments. Therefore, the CPU 1 must locate proper break points in the machine code program 20, thereby correctly loading to normal memory the bytes of the original machine code program that were expected to be loaded in the defective memory cells.

Next, the machine code program 20 is scanned to find all the break points (S12). In a general machine code program, every complete instruction in an instruction segment can be regarded as breakable. Because this type of code can be fragmented when CPU 1 is executed, it can still correctly decode instruction messages. On the other hand, the data segments and the stack segments cannot be randomly separated from each other because there might be some correlation between various data items, such as array data structures that cannot be recognized until executed. In addition, the CPU 1 cannot directly distinguish the instruction segments from the other segments in a machine code program. Therefore, the CPU 1 has to scan the whole instruction segments in the machine code program 20 to decipher all possible break points.

Figure 5:
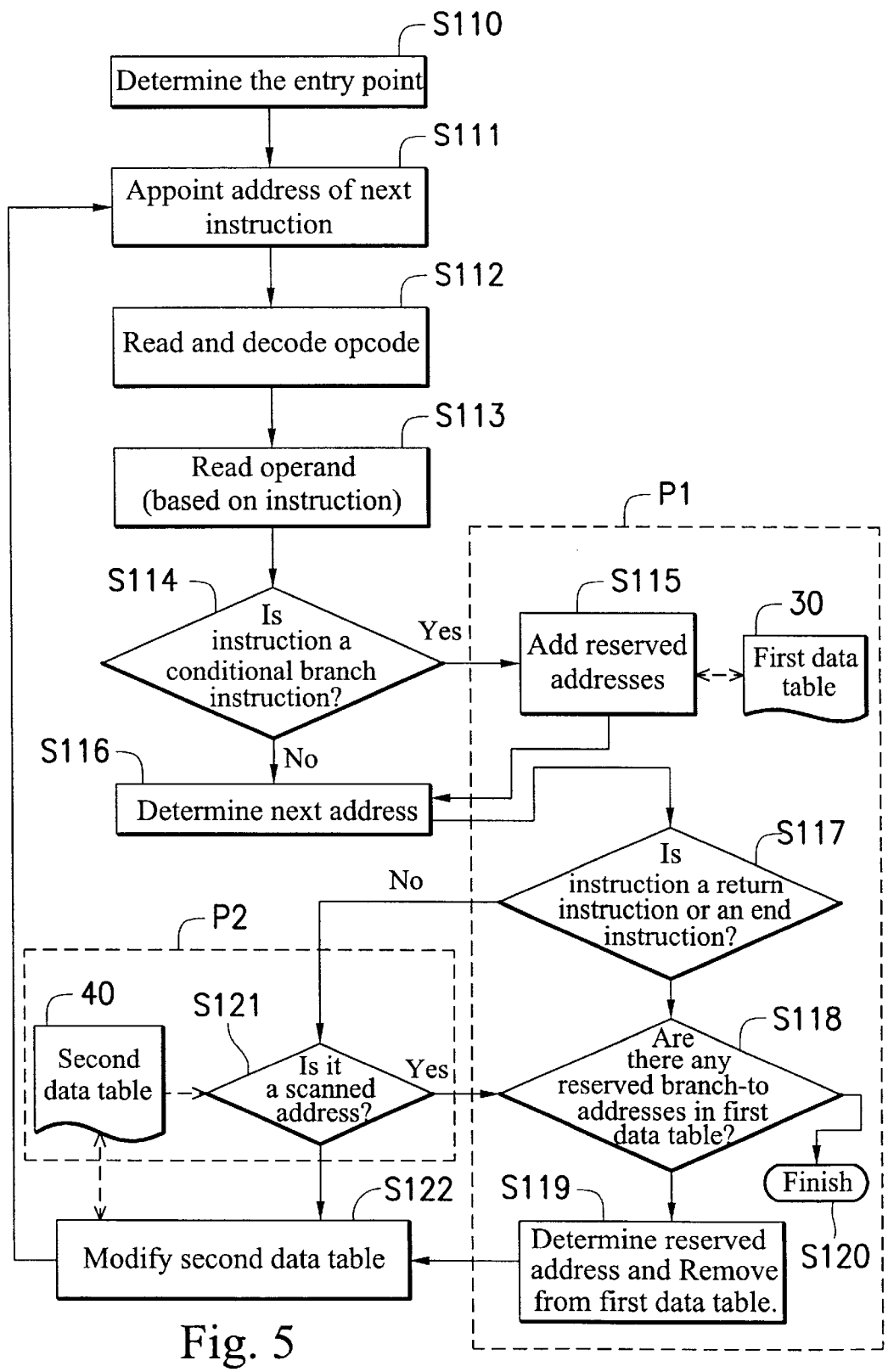
FIG. 5 shows a flowchart of scanning a machine code program used in all the embodiments of the present invention.

FIG. 5 shows a flowchart of the method of scanning the machine code program 20 in this embodiment. The term "scanning" herein includes the steps of retrieving opcodes, decoding the opcodes and retrieving operands. Execution actions are not required. To completely scan the whole instruction segments in the machine code program 20, two particular instruction types that are often seen in a general machine code program, including branching and looping, have to be dealt with in particular. A branch-type instruction can generate two different execution sequences. For example, the branch-type instruction can be one of the conditional branch instructions, such as JNE (Jump if Not Equal), JE (Jump if Equal) and JG (Jump if Greater than). In order to ensure scanning of all instructions, it is necessary to scan two possible execution sequences during the scanning process. In this embodiment, a first data table 30 (as shown in FIG. 5) is setup prior to the scanning process. When a conditional branch instruction is scanned, we can save the next address of the branch instruction or the branch-to address of the branch instruction in the first data table 30. Therefore, after the scanning of one execution sequence is finished, the other execution sequence can be scanned by cross-referencing the first data table 30. In fact, branch-type instructions also include unconditional branch instructions, such as JMP (Jump). Since this kind of branch-type instructions will not incur two possible execution sequences, the scanning process in this embodiment continues as usual and the next scanned address is the branch-to address of this instruction.

On the other hand, the loop-type instructions can sometimes induce endless scanning. In this embodiment, a second data table 40 is previously setup before the scanning process for recording the address range that has been scanned. The second data table 40 is updated every time as an instruction is scanned. When an inner loop is repeatedly scanned, it can be judged according to the second data table 40 that these instructions has been scanned and therefor the subsequent instructions can be excluded from subsequent scanning.

All of the steps shown in FIG. 5 are described in detail below. First, the entry point of the program is acquired (S11). Then, the address of the next instruction is assigned and appointed (S11). According to the address, the opcode of the next instruction is read and decoded (S112). If the instruction requires one or more operand(s), the operand is read from the subsequent address (S113). Once the complete instruction is read, a break point can be recorded. Next, the loader judges if the current instruction is a conditional branch instruction (S114). If so, there are two possible alternatives to proceed with scanning. The first option is to add the branch-to address of this conditional branch instruction to the first data table 30 (S115) and continue scanning the program from the next address of the conditional branch instruction. The alternative is to add the next address of the conditional branch instruction to the first data table 30 and then continue scanning the program from the branch-to address of the conditional branch instruction. Then, the next address to be scanned is determined (S116) and the loader judges if the instruction at this address is a return instruction (such as RET) or a termination/end instruction (such as END) (S117). If the instruction at the next address is not a return instruction or a termination/end instruction, the loader judges, according to the second data table 40, if the address is in the scanned address range (S121). If the next address is not in the scanned address range, the second data table 40 is modified so as to update the scanned address range (S122) and then the scanning proceeds from the next instruction. If in step S117 the instruction at the next address is indeed a return instruction or a termination/end instruction, or in the step S121 the next address is in the scanned address range, the loader judges if there is any address ready to be scanned in the first data table 30. If so, the address ready to be scanned is moved out of the first data table 30 (S119) and the scanned address range defined in the second data table 40 is updated (S122). The scanning procedure can then continue from the fetched address retrieved from the first data table 30. If there is no stored address ready to be scanned stored in the first data table 30, it means that all the instructions in the program have been scanned (S120). Meanwhile, all the break points, the instruction segments and the data/stack segments have been sequenced in the machine code program 20. In FIG. 5, the dotted box P1 indicates the related steps that deal with the branch-type instructions and the dotted box P2 indicates the related steps that deal with the loop-type instructions.

The processing actions in the aforementioned scanning process are briefly described below.

(1) If the current instruction is a conditional branch instruction (such as JNE, JE, JG, and so on), the branch to address or the next address of this conditional branch instruction is stored in the first data table 30.

(2) When an instruction has been completely processed, the address range defined in the second data table 40 is updated and a corresponding break point is outputted.

(3) If the retrieved instruction is an end instruction or a return instruction or the address of the retrieved instruction is located within the address range defined in the second data table 40, the addresses stored in the first data table 30 can be regarded as new starting points of the scanning process. Note that these addresses to be scanned cannot be located within the address range defined in the second data table 40.

Figure 6:
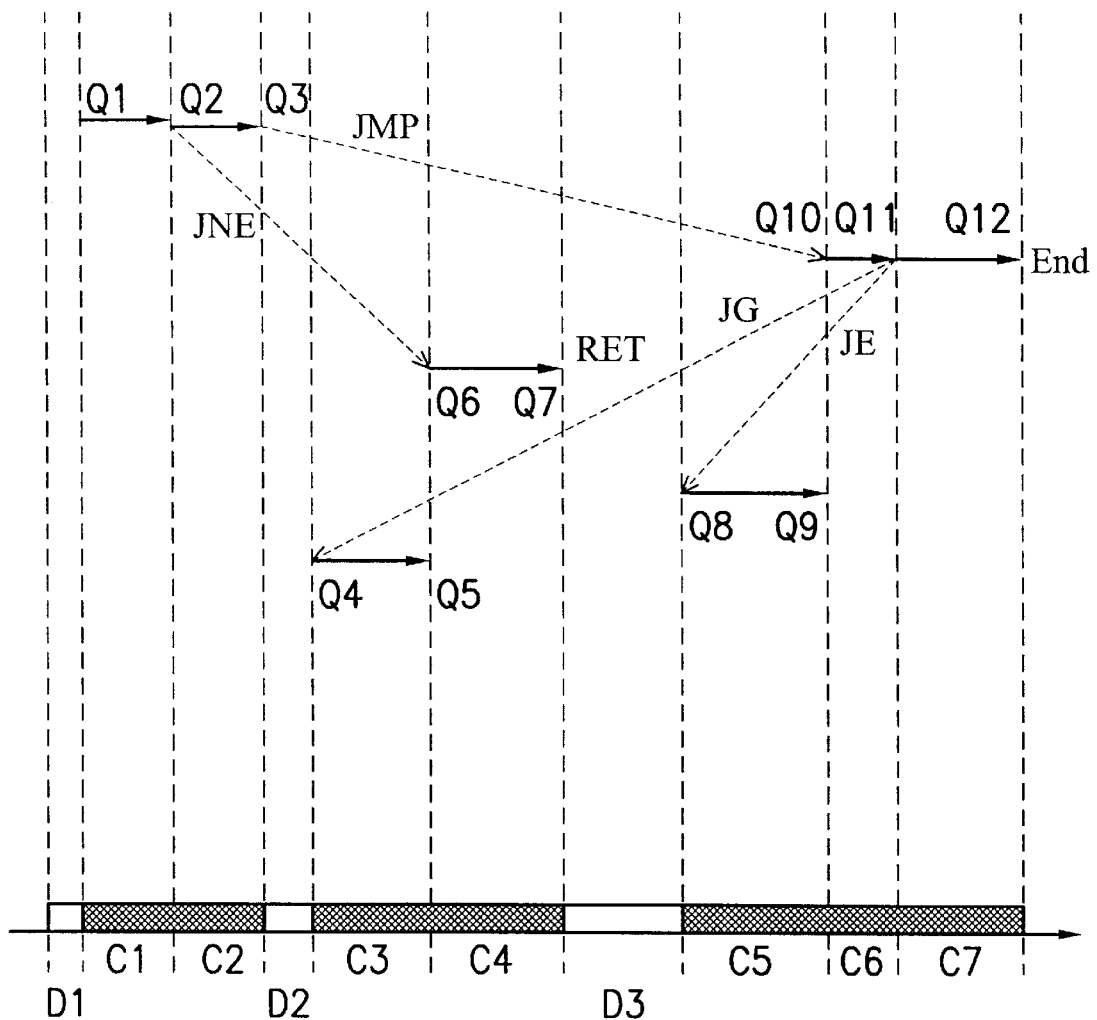
FIG. 6 shows a diagram of an example of scanning the machine code program according to the method used in the present invention.

According to the scanning process described in FIG. 5, the practical scanning actions will be demonstrated by using an example. FIG. 6 shows diagrams of an example of scanning a machine code program to acquire the break points therein according to the scanning process described in FIG. 5. The symbol Q1 denotes an entry point of this program. First, the instructions within the area from Q1 to Q2 are sequentially scanned. There is a conditional branch instruction JNE that appears at the address Q2. When the conditional branch instruction JNE is scanned, the branch-to address Q6 of the conditional branch instruction JNE is stored in the first data table 30. Then the instructions within the area from Q2 to Q3 are sequentially scanned. Note there is an unconditional branch instruction JMP at the address Q3. As described above, it is unnecessary to specially process unconditional branch instructions. Therefore, the branch-to address Q10 of the unconditional branch instruction JMP does not need to be stored while the scanning continues directly from the branch-to address Q10. The instructions within the area from Q10 to Q11 are sequentially scanned. At the address Q11, there are two conditional branch instructions JG and JE. The branch-to addresses Q4 and Q8 of the two branch instructions are stored in the first data table 30 and the scanning continues. When the instruction at the address Q12 is scanned, the termination instruction END is read and therefore the scan on the main program block is ended. Meanwhile, the scanned address range includes the codes C1, C2, C6 and C7, and there are three addresses Q6, Q4 and Q8 recorded in the first data table 30 ready to be scanned.

Then the scanning process continues from the first address Q6 stored in the first data table 30 and halts when the return instruction RET at the address Q7 is read. Next, the scanning process continues from the second address Q4 stored in the first data table 30. Note that there is no termination/end instruction or return instruction at the address Q5. However, the next address Q6 belongs to the scanned address range defined in the second data table 40 and, therefore, the scanning process can halt. Finally, the scanning process still continues from the third address Q8 stored in the first data table 30. Similarly, there is no termination/end instruction or return instruction at the address Q9. However, the next address Q10 belongs to the scanned address range defined in the second data table 40 and, therefore, the scanning process again halts. With no other address to be scanned stored in the first data table 30, the whole scanning process is finished. During the scanning process, all break points in the machine code program (before or after a complete instruction) have been determined. In addition, it is determined that the codes C1–C7 are the instruction segments and the codes D1–D3 are data/stack segments. Note that the blocks of codes that have not been scanned during the scanning process can be regarded as the data/stack segments.

In FIG. 4, when the scanning process on the original machine code program 20 is finished, according to the acquired break points, a first break point and a second break point that are respectively located before and after a matched code address corresponding to the defective memory cell can be selected (S13). As described above, the addresses before or after complete instructions can be regarded as break points. In the following description, the codes (instruction segments or data/stack segments) between the first break point and the second break point is called a code block or movable code blocks. The code block needs to be moved to another location to bypass the defective address (corresponding to the defective memory cell). In this embodiment, the way to decide a first break point and a second break point is that they must be close to the matched code address but with several bytes remaining in between. That is, there are still several good memory cells between the first/second break points and the defective address for storing linking instructions, which will be described later.

Note that the present invention is not limited to the aforementioned way to choose the break points. For example, the first/second break points can also be chosen in a way where there are several break points between the first/second break points and the defective address. Furthermore, if the subsequent code movement (described later) moves the code block downward by shifting a predetermined length of bytes, the first break point can be set before the defective address by several bytes and the second point can be set after the last byte of the machine code program by several bytes. In addition, the codes near and after the defective address are set as the movable code block. Therefore this movable code block can be moved behind the defective address to achieve the objective of the present invention.

After the movable code block between the first break point and the second break point is determined, the movable code block can be moved to the area between a first address and a second address that does not encompass the defective address (S14). In other words, the memory cells corresponding to the area to which the movable block of codes will be moved does not include any defective memory cell. After re-addressing the moved code block, certain linking instructions must be inserted to maintain the executing sequence of the original machine code program if the moved code block includes instructions. In this embodiment, the connection is achieved mainly by inserting two unconditional branch instructions (JMP). The first unconditional branch instruction is inserted at the address of the first break point and the branch-to address of the first inserted branch instruction is directed at the beginning of the moved code block. The second unconditional branch instruction is inserted after the moved code block and the branch-to address of the second inserted branch instruction is directed at the second break point. However, if the address of the second break point is set at the bottom of the original machine code program, the second unconditional branch instruction is not required. Therefore, when the first inserted unconditional branch instruction at the address of the first break point in the modified machine code program is executed, the execution sequence will jump to the moved code block via the first inserted unconditional branch instruction. When the instructions of the moved code block have been completely executed, the execution sequence will jump back to the instruction at the address of the second break point via the second inserted unconditional branch instruction. Further, if the code block is simply a data/stack segment, linking instructions are not required and only the reference addressing information needs to be modified.

Figure 7:
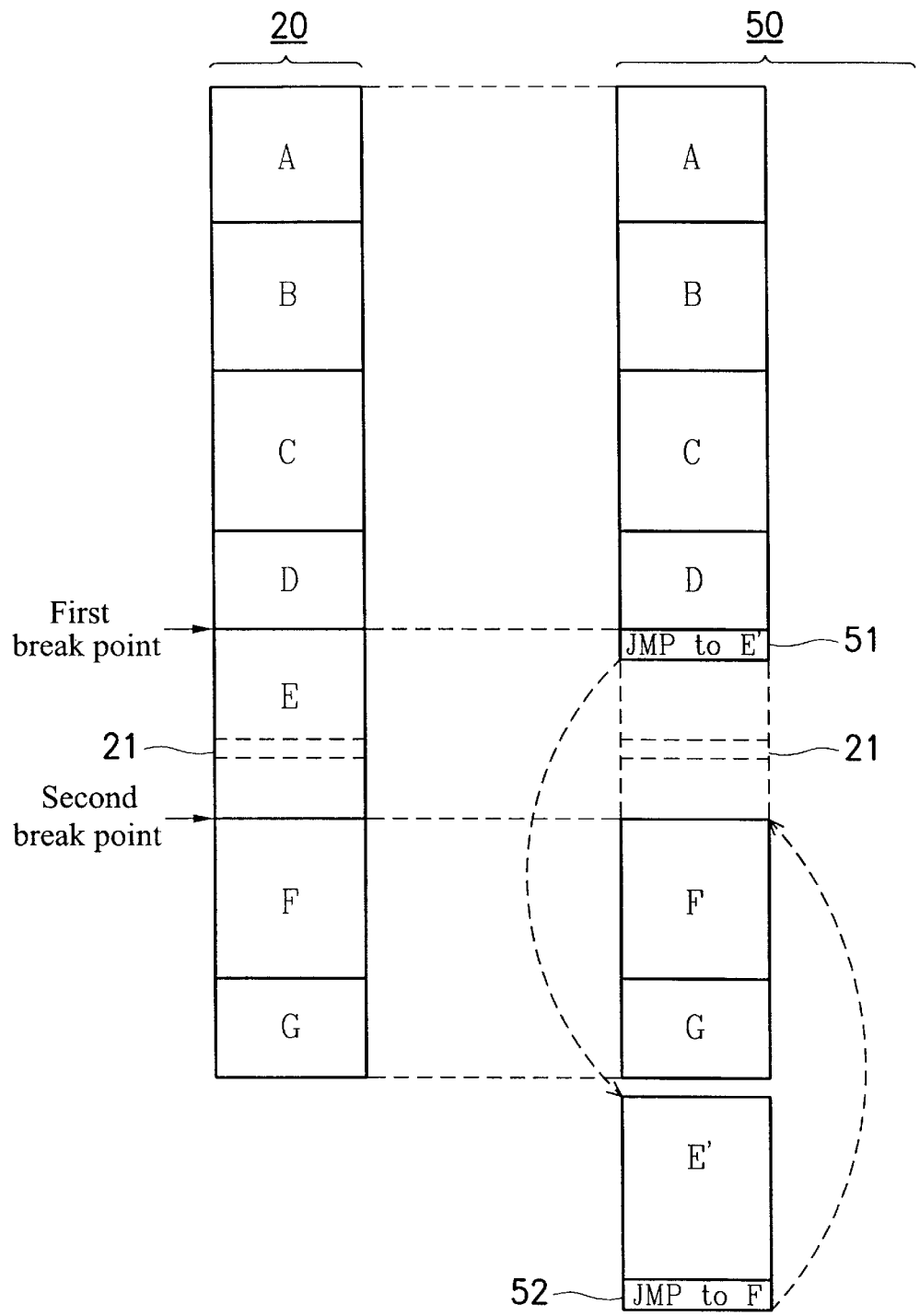
FIG. 7 shows a diagram illustrating the procedure of connecting a moved code block to other portions of an original machine code program that are stationary in accordance with the present invention.

FIG. 7 is a diagram of connecting the moved code block to the unmoved portions of the original machine code program in this embodiment. As shown in FIG. 7, the original machine code program includes the code segments denoted by A to G and the defective address 21 is located in code segment E. The first break point and the second break point are decided as the beginning and the ending of code segment E. When the code segment E is moved to a new address range, the moved code segment is denoted by E'. The numerals 51 and 52 respectively indicate the inserted first and second unconditional branch instruction. When code segment D is completely executed, the execution sequence jumps to the moved code segment E' via the first unconditional branch instruction 51. When the moved code segment E' is completely executed, the execution sequence jumps back to the code segment F via the second unconditional branch instruction 52. Therefore, the execution sequence of the original machine code program can be maintained and only two additional unconditional branch instructions must be executed.

Figure 8:
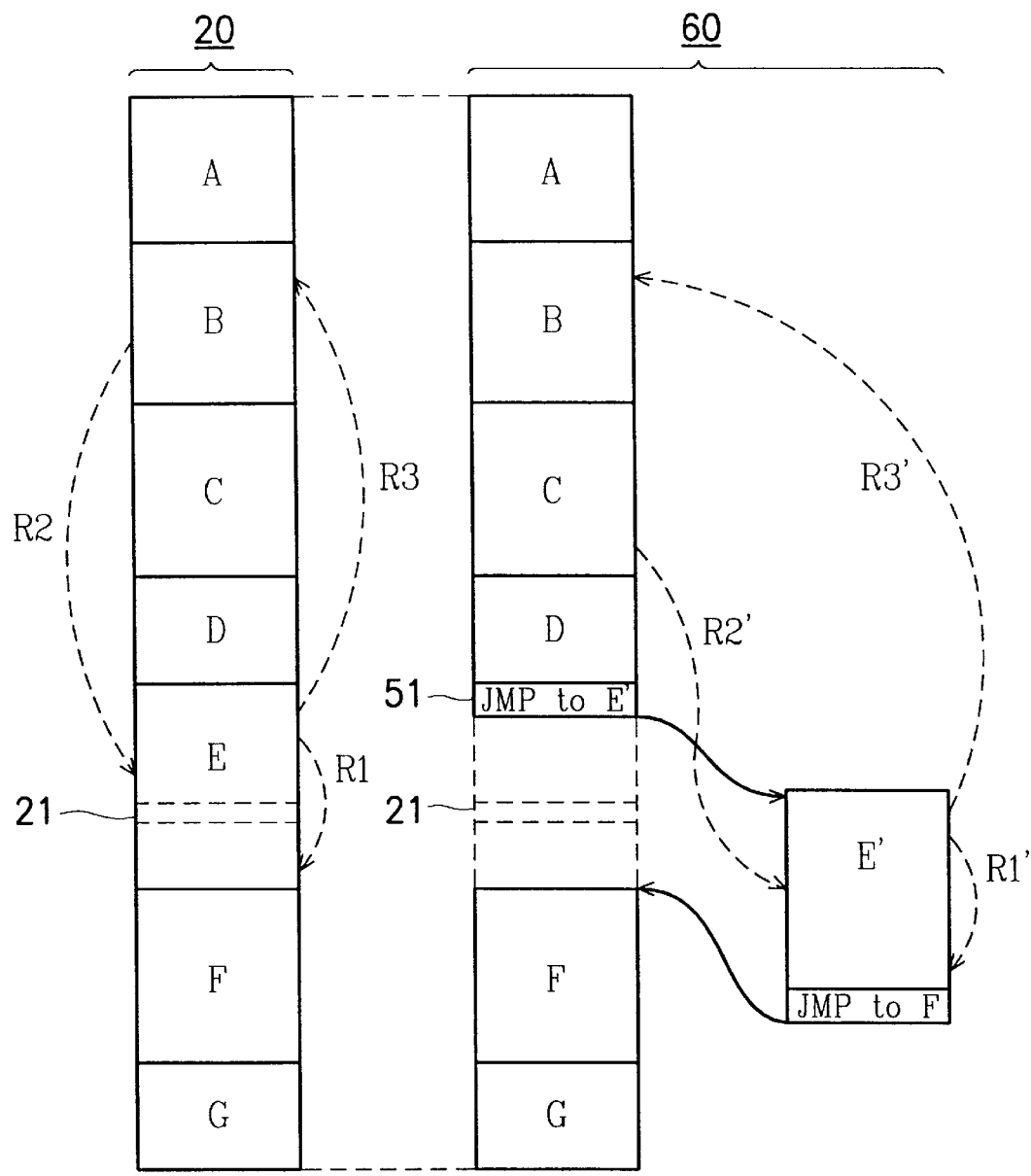
FIG. 8 shows a diagram illustrating the procedure of modifying reference addresses in accordance with the present invention.

When the linking step S15 is finished, the last preprocessing step that the loader needs to perform is to modify the issue of reference addressing, which is induced by moving the code block. If the reference addresses in the original machine code program 20 are related to the movable block code, examination and modification is necessary. Therefore, the CPU 1 has to modify the related reference addresses (S16). FIG. 8 shows a schematic diagram of modifying reference addresses in this embodiment. As shown in FIG. 8, three reference addressing cases in the original machine code program 20 are related to code segment E which contains the defective address. They are denoted by R1, R2 and R3. R1 indicates the case in which the addressing reference used in an instruction of code segment E is directed at the address in code segment E. R2 indicates the case in which the addressing reference used in an instruction in the other code segment (such as the code segment C) is directed at the address in code segment E. R3 indicates the case in which the addressing reference used in an instruction in code segment E is directed at the address in some other code segment (such as the code segment B). These addressing references have to be modified (denoted by R1', R2' and R3') after the code segment E is moved to be the code segment E', so as to generate the machine code program 60 that can be practically loaded into the memory 3 and executed.

The first step of modifying the addressing references is that the CPU 1 may scan the whole original machine code program 20 again to find the addressing references that are related to the movable code block code containing the defective address. In general, there are two modes of addressing references. One is the relative addressing mode and another is the absolute addressing mode. In view of the two addressing modes and the three kinds of addressing references mentioned above, there are six cases that should be considered. In the case of the addressing reference R1, only the addressing references in the absolute addressing is mode need to be modified. In the case of the addressing reference R3, only addressing references in the relative addressing mode need to be modified. In the case of the addressing reference R2, the addressing references in both of the absolute addressing mode and the relative addressing mode need to be modified. In addition, the addressing references in the absolute addressing mode, which are all directed to the code segment E, can be modified by adding the relative shift length between the original code segment E and the moved code segment E' to the original addressing references. Similarly, the addressing references in the relative addressing mode also can be modified by using the relative shift length between the original code segment E and the moved code segment E'. However, it is known that the relative addressing mode has a limitation in the referenced addresses, which shall not exceed a predetermined range. Therefore, it is more complicated to deal with the addressing references in the relative addressing mode. One way to solve this problem is to insert certain linking instructions in the reserved space located before and after the practical defective address to indirectly link the instruction containing the addressing reference and the destination address. Another way is to downwardly shift all of the codes after the defective address by several bytes (i.e. in the higher address direction) in order to avoid the defective memory cell. Accordingly, the movable code block does not move so far as to exceed the range of the relative addressing mode. The other way is to adjust the instruction format compiled by the compiler. For example, the compiler can use the absolute addressing mode to compile the source code program as far as possible, rather than the relative addressing mode. In addition, the compiler can change the addressing mode of the addressing references which may be affected due to the long-distance movement of the movable code block.

When these preprocessing steps are finished, the loader executed in the CPU 1 can load the original machine code program, the linking instructions and the moved code block to the memory 3 (S117). Since the code block that initially ought to be loaded in the defective memory cells has been moved, the loaded machine code program can be properly executed.

In addition, although this embodiment adopts the case of a single defective memory cell in the above description, it is understood by those skilled in the art that the similar preprocessing steps can be applied to the case of more than one defective memory cells. In addition, although this embodiment adopts the scanning process to determine the break points, it is understood by those skilled in the art that the source code program can be modularized to determine the separations of the modularized blocks as break points without the scanning process described in this embodiment.

In addition, the embodiment described above is preferably applied to applications such as the system-on-a-chip or single chip computers. In such systems, memory modules are generally embedded and cannot be replaced at will. When some memory cells are found to be defective, the method disclosed in the embodiment can be applied and the whole chip can still normally execute various programs. Furthermore, the process of dealing with defective memories disclosed in this embodiment can also be applied to the programming of flash memories or EEPROMs (electrically erasable programmable read-only memories). Therefore, these memory devices can still work even though there are some defective memory cells therein. Most importantly, the embodiment neither increases the cost and the complexity of the hardware design nor noticeably raises the execution workload.

The Second Embodiment

Some preprocessing steps have been disclosed in the first embodiment to solve the problem of partially defective memories. Note that there are some steps that are changeable. The second embodiment is derived from a change in the way of scanning source code and the order of loading memory.

Figure 9:
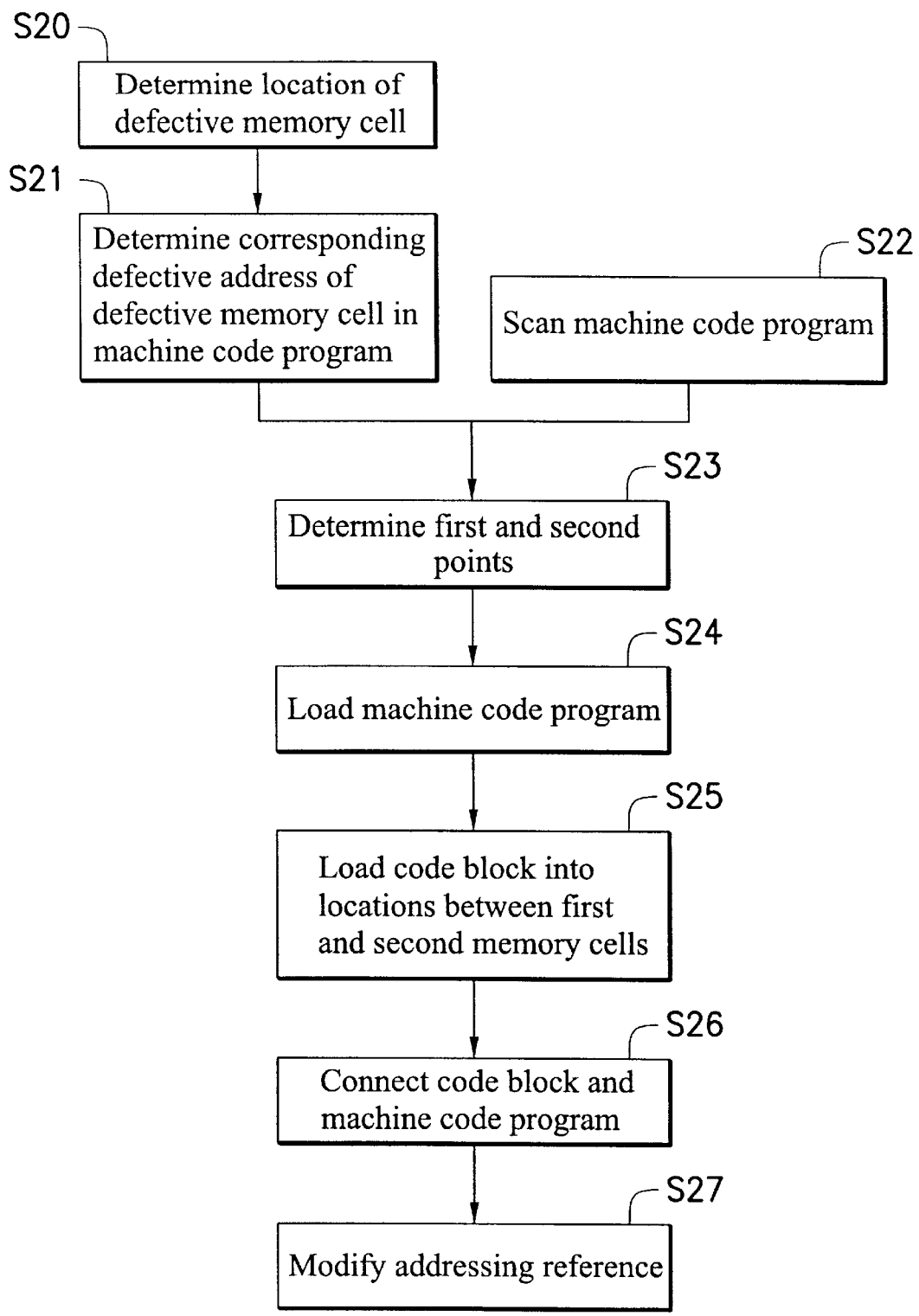
FIG. 9 shows a flowchart of a method of processing a partially defective memory in accordance with the second embodiment of the present invention.

FIG. 9 shows a flowchart of the method of processing a partially defective memory in accordance with the second embodiment. As shown in FIG. 9, in addition to determining the physical location of the defective memory cell (S20) as well as the corresponding defective address of the defective memory cell in the original machine code program 20 (S21), the CPU 1 has to scan the original machine code program 20 (S22). In steps S20 and S21, the defective address of the defective memory cell can be determined, and in step S22, the break points in the original machine code program 20 can be determined. The synchronous processes can be performed in the CPU with multiplexing function or a system with multiple CPUs. Next, according to the defective addresses and the addresses of the break points, the first break point and the second break point that is used to define the scope of the movable code block can be determined (S23).

The following steps in this embodiment are different from those in the first embodiment. First, the whole original machine code program 20 is loaded to the memory 3 (S24), while the movable code block (which includes the defective address) is also loaded into the memory cells, including the defective memory cell. However, since the defective memory cell is included in the loaded region, the currently loaded code block is useless.

Next, the code block is loaded again to the memory locations between a first memory cell and a second memory cell in the memory 3 (S25). The memory cells in the reloaded region will not include any defective memory cells. Next, similar to the steps in the first embodiment, several linking instructions are inserted to connect the reloaded code block and the other portions of the original machine code program 20 (S26). Finally, the addressing references pertaining to the reloaded code block are modified (S27). As in the first embodiment, the program in the memory 3 at present can be properly executed, and the executable codes stored in the memory 3 are not stored in the defective memory cell.

In the second embodiment, the original machine code program 20 and the movable or reloaded block code are loaded in different phases, and then the whole codes stored in the memory 3 are processed by inserting the linking instructions and modifying addressing references. Such a process can reach better processing efficiency in addition to achieving the same effect of the first embodiment. The machine code program is generally read from external storage medium, such as hard disk drives and floppy disk drives. Therefore, the processing speed for executing the linking process and the modification of the addressing references is slower in these storage medium than in the memory 3. Especially, in the modification of the addressing references, the whole machine code program has to be scanned again. In this embodiment, the machine code program has been loaded into the memory 3 before being processed and, therefore, these preprocessing steps can be finished quickly. Another way to speed up the scanning speed is to store the original machine code program in a memory device that contains no defective memory cells, such as ROM, RAM or PROM. However, such a scheme requires temporarily or permanently storing the machine code program in an extra perfect memory device or a part of a memory device that is assured to include no defective memory cell.

The Third Embodiment

The first and the second embodiments are applied to applications where the machine code program has not been loaded to memory containing defective memory cells. In these cases, the CPU can perform some preprocessing steps before the machine code program is executed thereby adjusting the program to avoid known defective memory cells. The situation in the third embodiment is that the machine code program has been successfully loaded to the memory and executed, but some memory cells show weakness in function after a period of time. These memory cells with weak function may currently be read properly. But, the logic values read from these weakening memory cells will be uncertain in the future. Meanwhile, the version of the machine code program now stored in the memory device must be adjusted to free the memory space corresponding to these weakening memory cells.

Figure 10:
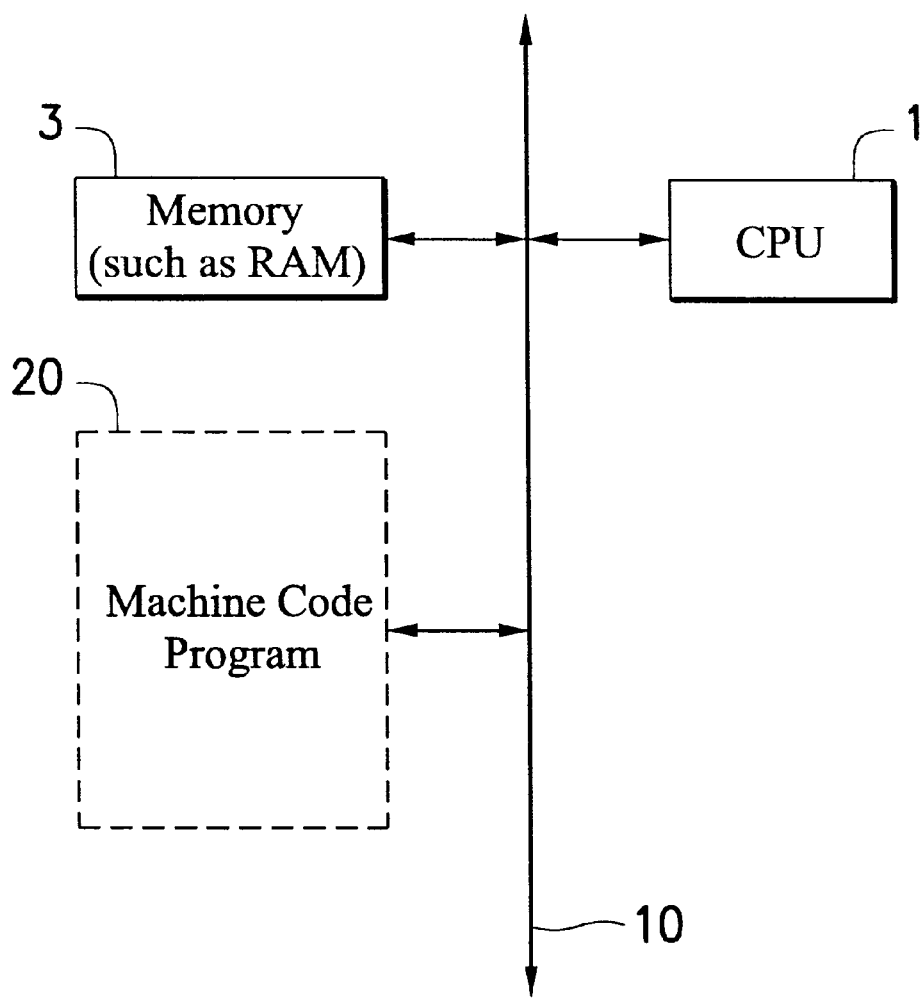
FIG. 10 shows a block diagram of a system for processing a partially defective memory in accordance with the third embodiment of the present invention.

FIG. 10 shows a block diagram of the system for processing a partially defective memory in accordance with the third embodiment. As shown in FIG. 10, the machine code program 20 has been loaded in memory 3. During the period of normal system operation, each memory cell in memory 3 will be periodically tested by means of the CPU 1 itself or an external processor/tester. If the data read from some memory cells becomes more and more difficult to recognize, the CPU 1 can set these memory cells as weakening memory cells. In this embodiment, the processing steps disclosed below can be executed to free the memory space corresponding to these weakening, defective memory cells.

Figure 11:
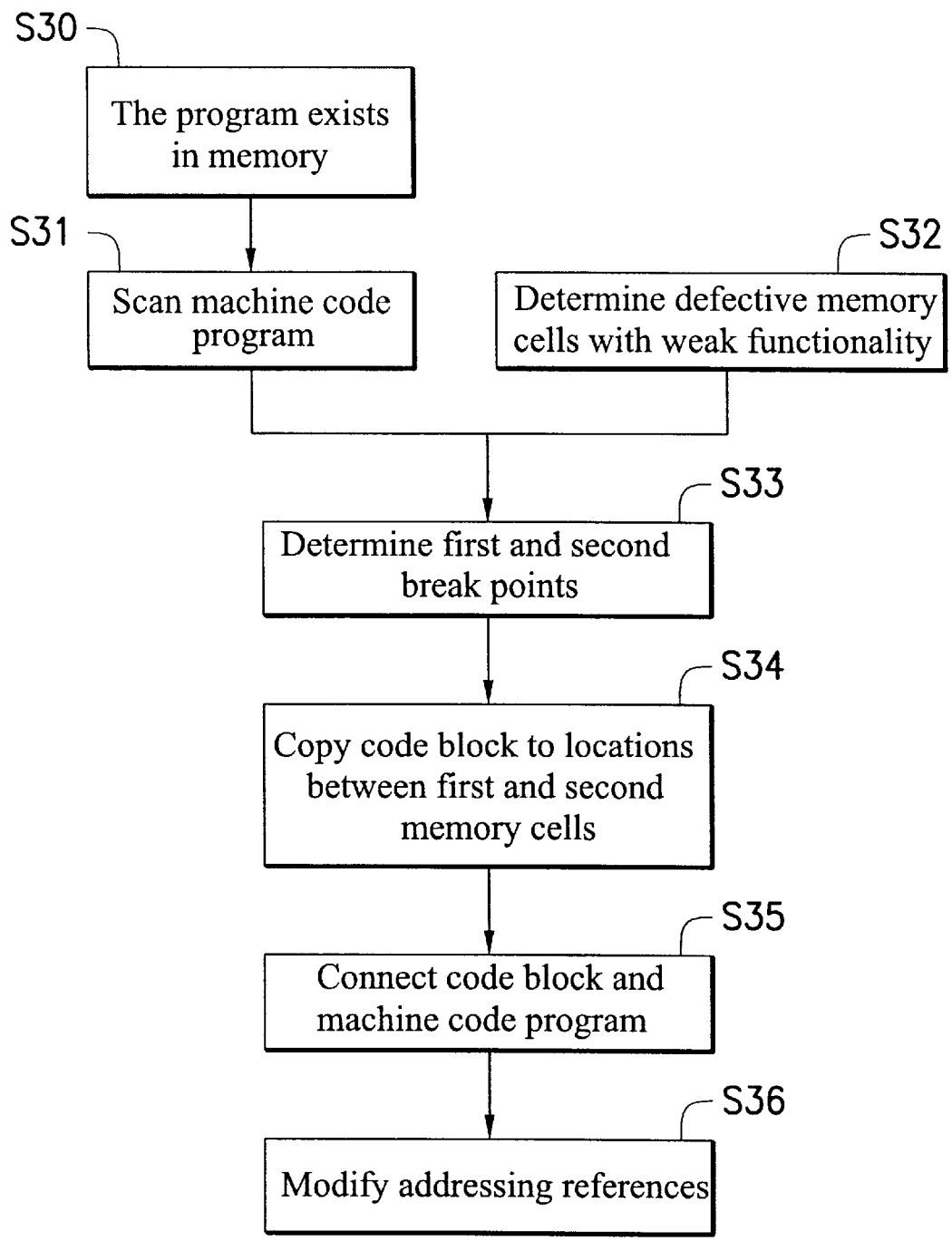
FIG. 11 shows a flowchart of a method of processing a partially defective memory in accordance with the third embodiment of the present invention.

FIG. 11 shows a flowchart for the method of processing a partially defective memory in accordance with the third embodiment. As shown in FIG. 11, the machine code program 20 has loaded in memory 3 (S30). In addition to scanning the machine code program 20 (S31) to get all of the break points in machine code program 20, the CPU 1 can periodically test the memory 3 to search for the weakening memory cells (S32). Since the machine code program 20 has been loaded to the memory 3, the defective addresses corresponding to these weakening memory cells can be deciphered based on the weakening memory cells. According to the defective addresses and the addresses of the determined break points, the first break point and the second break point for defining the range of the movable code block can be further decided (S33).

The next step is to find a memory block that can work properly in memory 3, which is located between the first memory cell and the second memory cell, thereby storing the code block that needs to be moved. Then, the code block is copied to the memory block between the first memory cell and the second memory cell (S34). Similar to the first embodiment, some linking instructions are inserted to connect the moved code block, other unmoved portions of the machine code program 20 (S35) as well as the addressing references therein (S36). Now the modified machine code program in the memory 3 can be normally executed without concern for the weakening of some memory cells in memory 3.

In conclusion, the system and method of processing the partially defective memory in the present invention has the following advantages:

1. The techniques to solve partially defective memories in the present invention do not need to change the hardware design, the memory structure, or expand the hardware circuitry. In addition, the defective memory cells are not used to store any codes by modifying the machine code program ready to be loaded. The execution workload of the program code only slightly increases. In the best situation, only two additional unconditional branch instructions are added. Therefore, the present invention can be easily applied to commercial products without an increase in design complexity or cost.

2. The present invention can be applied to not only the memory devices with known defective memory cells, but also to the memory devices in use, such as the case described in the third embodiment.

3. The hardware repair scheme adopted by the prior art needs to extract the memory device to be fixed from the system in use. The present invention, however, can adjust the machine code program that has been stored in the memory in use. This scheme can facilitate the repair operation.

In addition, if the memory device contains a plurality of dispersed defective memory cells, the method disclosed above also can be applied. First, several pairs of break points that correspond to and include these defective memory cells are determined according to the scanning process and the determination method disclosed in these embodiments. Then a plurality of movable code blocks defined by these pairs of the break points are moved to different, new addressing spaces. After the linking instructions are inserted and the related addressing references are modified, the modified machine code program is not loaded in these defective memory cells and can be properly executed.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description. It is therefore contemplated that the appended claims will cover any such modifications or embodiments as may fall within the scope of the invention defined by the following claims and their equivalents.

What is claimed is:

1. A method of loading an original machine code program into a memory device having a plurality of memory cells available for execution, comprising the steps of:

determining if the memory device includes a defective memory cell;

loading the original machine code program into the memory device when the memory device includes no defective memory cell;

executing a process when the memory device includes the defective memory cell;

wherein the process comprises the steps of:

determining a first break point of the original machine code program before a matched code address corresponding to the defective memory cell and a second break point of the original machine code program after the matched code address;

moving a code block between the first break point and the second break point to an address space between a first address and a second address, the matched code address being excluded in the address space;

linking an execution sequence between the moved code block and an unmoved portion of the original machine code program when the moved code block includes at least one executable instruction, the execution sequence being defined in the original machine code program; and loading the unmoved portion of the original machine code program and the moved code block to the memory device.

2. The method as claimed in claim 1, further comprising a step of:
   modifying an addressing reference correlated with one of the moved code blocks and the unmoved portion of the original machine code program before the loading step of the process.

3. The method as claimed in claim 2, wherein in the modifying step, the addressing reference is in the absolute addressing mode.

4. The method as claimed in claim 2, wherein in the modifying step, the addressing reference is in the relative addressing mode.

5. The method as claimed in claim 1, wherein the step of determining the first break point and the second break point further comprises the steps of:
   sequentially reading instructions of the original machine code program;
   outputting a plurality of break points of the original machine code program according to the addressing information of the instructions of the original machine code program; and
   selecting the first break point and the second break point from the output break points in the original machine code program according to the matched code address.

6. The method as claimed in claim 5, wherein the step of sequentially reading the instructions of the original machine code further comprises the steps of:
   providing a first data table and a second data table, wherein the second data table records an address range that has been read;
   recording one of a branch-to address and a next address of a conditional branch instruction in the first data table when the read instruction is the conditional branch instruction;
   updating the address range recorded in the second data table after reading each of the instructions;
   scanning the instructions of the original machine code program by using the first data table; and
   examining an reiteration condition by using the second data table.

7. The method as claimed in claim 1, wherein the linking step is achieved by inserting a first branch instruction at the first break point and a second branch instruction at the second address, the first branch instruction having a jump-to address directed to the first address and the second branch instruction having a jump-to address directed to the second break point.

8. The processing method as claimed in claim 1, wherein said second break point is after the last byte of said source code.

9. A system for processing a memory device having a plurality of memory cells, comprising:
   a processor, coupled to the memory device, for loading an original machine code program to the memory device;
   wherein the processor loads the original machine code program to the memory device when the memory device includes no defective memory cell;
   wherein the processor executes a process when the memory device includes a defective memory cell:
   wherein the process includes a step of determining a first break point of the original machine code program before a matched code address corresponding to the defective memory cell and a second break point of the original machine code program after the defective address;
   wherein the process includes a step of moving a code block between the first break point and the second break point to an address space between a first address and a second address;
   wherein the process includes a step of linking an execution sequence between the moved code block and an unmoved portion of the original machine code program when the moved code block includes at least one executable instruction and the execution sequence is defined in the original machine code program;
   wherein the process includes a step of loading the unmoved portion of the original machine code program and the moved code block to the memory device; and
   wherein the matched code address is not included in the address space.

10. The system as claimed in claim 9, wherein the second break point is located behind the end of the original machine code program.

11. The system as claimed in claim 9, wherein the processor further modifies an addressing reference correlated with one of the moved code block and the unmoved portion of the original machine code program.

12. The system as claimed in claim 9, wherein in the linking step the processor inserts a first branch instruction at the first break point and a second branch instruction at the second address;
   wherein the first branch instruction has a jump-to address directed to the first address; and
   wherein the second branch instruction has a jump-to address directed to the second break point.

13. The system as claimed in claim 9, wherein the memory device and the processor are located in the same chip.

14. The system as claimed in claim 9, wherein the memory device and the processor are located on different chips.

15. A method of processing an original machine code program stored in a memory device, comprising the steps of:
   examining if there is a weakening memory cell of the memory device;
   executing a process when the memory device includes the weakening memory cell;
   wherein the process comprises the steps of:
      determining a first break point of the original machine code program before a defective address corresponding to the weakening memory cell and a second break point of the original machine code program after the defective address;
      moving a code block between the first break point and the second break point to a memory space between a first memory cell and a second memory cell in the memory device, the weakening memory cell being not included in the memory space; and
      linking an execution sequence between the moved code block and an unmoved portion of the original machine code program when the moved code block includes at least one executable instruction, the execution sequence being defined in the original machine code program.

16. The method as claimed in claim 15, wherein the second break point is located behind the end of the original machine code program.

17. The method as claimed in claim 15 further comprising a step of:
   modifying an addressing reference correlated with one of the moved code block and the unmoved portion of the original machine code program.

18. The method as claimed in claim 17, wherein in the modifying step the addressing reference is in an absolute addressing mode.

19. The method as claimed in claim 17, wherein in the modifying step the addressing reference is in a relative addressing mode.

20. The method as claimed in claim 15, wherein the step of determining the first break point and the second break point further comprises the steps of:
   sequentially reading instructions of the original machine code program;
   outputting a plurality of break points of the original machine code program according to addressing information of the instructions of the original machine code program; and
   selecting the first break point and the second break point from the output break points in the original machine code program according to the defective address.

21. The method as claimed in claim 20, wherein the step of sequentially reading the instructions of the original machine code further comprises the steps of:
   providing a first data table and a second data table, the second data table recording an address range that has been read;
   recording one of a branch-to address and a next address of a conditional branch instruction in the first data table when the read instruction is the conditional branch instruction;
   updating the address range recorded in the second data table after reading each of the instructions;
   scanning the instructions of the original machine code program by using the first data table; and
   examining an reiteration condition by using the second data table.

22. The method as claimed in claim 15, wherein the linking step is achieved by inserting a first branch instruction at the first break point and a second branch instruction at the second memory cell, the first branch instruction having a jump-to address directed to the first memory cell and the second branch instruction having a jump-to address directed to the second break point.

23. A system for processing a memory device that has stored an original machine code program, comprising:
   a processor coupled to the memory device;
   wherein the processor examines if there is a weakening memory cell of the memory device and executes a process when the memory device includes the weakening memory cell;
   wherein during the process the processor scans the original machine code program and determines a first break point of the original machine code program before a defective address corresponding to the weakening memory cell and a second break point of the original machine code program after the defective address;
   wherein during the process the processor moves a code block between the first break point and the second break point to a memory space between a first memory cell and a second memory cell in the memory device;
   wherein during the process the process links an execution sequence between the moved code block and an unmoved portion of the original machine code program defined in the original machine code program when the moved code block includes at least one executable instruction; and
   wherein the weakening memory cell is not included in the memory space.

24. The system as claimed in claim 23, wherein the second break point is located behind the end of the original machine code program.

25. The system as claimed in claim 23, wherein the processor is directly coupled to the memory device.

26. The system as claimed in claim 23, wherein the processor further modifies an addressing reference correlated with one of the moved code block and the unmoved portion of the original machine code program.

27. The system as claimed in claim 23, wherein in the linking process the processor inserts a first branch instruction at the first break point and a second branch instruction at the second memory cell;
   wherein the first branch instruction has a jump-to address directed to the first memory cell; and
   wherein the second branch instruction having a jump-to address directed to the second break point.

28. The system as claimed in claim 23, wherein the memory device and the processor are located in the same chip.

29. The system as claimed in claim 23, wherein the memory device and the processor are located on different chips.

30. A method of loading an original machine code program into a memory device having a plurality of memory cells for executing, comprising the steps of:
   determining if the memory device includes a defective memory cell;
   loading the original machine code program into the memory device when the memory device includes no defective memory cell or the defective memory cell of the memory device is not used to store the original machine code program; and
   executing a process when the memory device includes the defective memory cell that is ready to be loaded by the original machine code program;
   wherein the process comprises the steps of:
      determining a first break point of the original machine code program before a matched code address corresponding to the defective memory cell and a second break point of the original machine code program after the matched code address;
      loading the original machine code program to the memory device;
      reloading a code block between the first break point and the second break point to a memory space between the a first memory cell and a second memory cell, the defective memory cell being not included in the memory space; and
   linking an execution sequence between the reloaded code block and a portion of the original machine code program that does not include the reloaded code block when the reloaded code block includes at least one executable instruction, the execution sequence being defined in the original machine code program.

31. The method as claimed in claim 30, further comprising a step of:
   modifying an addressing reference correlated with one of the reloaded code block and the portion of the original machine code program that does not contain the reloaded code block.

32. The method as claimed in claim 31, wherein in the modifying step, the addressing reference is in the absolute addressing mode.

33. The method as claimed in claim 31, wherein in the modifying step, the addressing reference is in the relative addressing mode.

34. The method as claimed in claim 30, wherein the step of determining the first break point and the second break point further comprises the steps of:
- sequentially reading instructions of the original machine code program;
- outputting a plurality of break points of the original machine code program according to the addressing information of the instructions of the original machine code program; and
- selecting the first break point and the second break point from the output break points in the original machine code program according to the defective address.

35. The method as claimed in claim 34, wherein the step of sequentially reading the instructions of the original machine code further comprises the steps of:
- providing a first data table and a second data table, the second data table recording an address range that has been read;
- recording one of a branch-to address and a next address of a conditional branch instruction in the first data table when the read instruction is the conditional branch instruction;
- updating the address range recorded in the second data table after reading each of the instructions;
- scanning the instructions of the original machine code program by using the first data table; and
- examining an reiteration condition by using the second data table.

36. The method as claimed in claim 30, wherein the linking step is achieved by inserting a first branch instruction at the first break point and a second branch instruction at the second address, the first branch instruction having a jump-to address directed to the first address and the second branch instruction having a jump-to address directed to the second break point.

37. A system for processing a memory device having a plurality of memory cells, comprising:
- a processor, coupled to the memory device, for loading an original machine code program to the memory device;
- wherein the processor loads the original machine code program to the memory device when the memory device includes no defective memory cell or the defective memory cell of the memory device is not used to store the original machine code program;
- wherein the processor executes a process when the memory device includes the defective memory cell that is ready to be loaded by the original machine code program;
- wherein the process determines a first break point of the original machine code program before a defective address corresponding to the defective memory cell and a second break point of the original machine code program after the defective address;
- wherein the process loads the original machine code program to the memory device;
- wherein the process reloads a code block between the first break point and the second break point to a memory space between the a first memory cell and a second memory cell;
- wherein the process links an execution sequence between the reloaded code block and a portion of the original machine code program that does not include the reloaded code block when the reloaded code block includes at least one executable instruction;
- wherein the defective memory cell is not included in the memory space; and
- wherein the execution sequence is defined in the original machine code program.

38. The system as claimed in claim 37, wherein the second break point is located behind the end of the original machine code program.

39. The system as claimed in claim 37, wherein the processor further modifies an addressing reference correlated with one of the moved code block and the unmoved portion of the original machine code program.

40. The system as claimed in claim 37, wherein in the linking process the processor inserts a first branch instruction at the first break point and a second branch instruction at the second memory cell;
- wherein the first branch instruction has a jump-to address directed to the first memory cell; and
- wherein the second branch instruction having a jump-to address directed to the second break point.

41. The system as claimed in claim 37, wherein the memory device and the processor are located in the same chip.

42. The system as claimed in claim 37, wherein the memory device and the processor are located on different chips.

43. A method of scanning a machine code program for determining break points therein, wherein said method comprises the steps of:
- providing a first data table and a second data table, the first data table recording a reserved address ready to be scanned and the second data table recording an address range in the machine code program that has been scanned;
- sequentially reading instructions of the machine code program;
- saving one of a branch-to address and the next address of a conditional branch instruction as the reserved address in the first data table and keeping reading the instructions of the machine code program from the other of the branch-to address and the next address of the conditional branch instruction when the read instruction is the conditional branch instruction;
- updating the address range recorded in the second data table and outputting the break points of the machine code program after reading each of the instructions.

44. The method as claimed in claim 43, further comprising a step of:
- removing the reserved address from the first data table and keeping reading the instructions of the machine code program from the reserved address when the read instruction is a termination instruction or the address of the read instruction is within the address range recorded in the second data table.

45. The method as claimed in claim 43, wherein the method of scanning the machine code program is used to determine a movable code block in the machine code program.

46. The method as claimed in claim 45, wherein the movable code block is adaptively loaded in non-defective memory cells of a memory device.

47. The method as claimed in claim 43, wherein the reserved address in the first data table is the branch-to address of the conditional branch instruction.

48. The method as claimed in claim 43, wherein the reserved address in the first data table is the next address of the conditional branch instruction.

49. The method as claimed in claim 43, further comprising a step of:

continuing to read the instructions of the machine code program from a branch-to address of an unconditional branch instruction when the read instruction is the unconditional branch instruction.

50. The method as claimed in claim 43, wherein the ending condition of scanning the machine code program is that the read instruction is the termination instruction or the address of the read instruction is within the address range record in the second data table, and there is no reserved address in the first data table.

51. The method as claimed in claim 43, wherein a series of codes, which has not been scanned after the scanning is ended, is determined as a non-instruction segment.

* * * * *